(12) United States Patent
Gregg

(10) Patent No.: US 6,874,040 B2
(45) Date of Patent: Mar. 29, 2005

(54) EMPLOYING A DATA MOVER TO COMMUNICATE BETWEEN DYNAMICALLY SELECTED ZONES OF A CENTRAL PROCESSING COMPLEX

(75) Inventor: Thomas A. Gregg, Highland, NY (US)

(73) Assignee: International Business Machines Corporation, Armonk, NY (US)

(*) Notice: Subject to any disclaimer, the term of this patent is extended or adjusted under 35 U.S.C. 154(b) by 360 days.

(21) Appl. No.: 09/740,440

(22) Filed: Dec. 19, 2000

(65) Prior Publication Data

US 2002/0078163 A1 Jun. 20, 2002

(51) Int. Cl.[7] .............................................. G06F 13/14
(52) U.S. Cl. ............................... 710/33; 710/1; 710/5; 710/7; 710/20; 710/21; 710/32; 710/39; 712/405
(58) Field of Search .............................. 710/1, 5, 7, 20, 710/21, 32, 33, 39, 52, 54; 712/405, 19

(56) References Cited

U.S. PATENT DOCUMENTS

| | | | |
|---|---|---|---|
| 5,377,337 A | 12/1994 | Antognini et al. | 395/375 |
| 5,416,921 A | 5/1995 | Frey et al. | 395/575 |
| 5,442,802 A | 8/1995 | Brent et al. | 395/200.08 |
| 5,446,734 A | 8/1995 | Goldstein | 370/60.1 |
| 5,557,611 A | 9/1996 | Cappellari et al. | 370/60.1 |
| 5,561,809 A | 10/1996 | Elko et al. | 395/800 |
| 5,583,990 A | 12/1996 | Birrittella et al. | 395/200.01 |
| 5,600,805 A | 2/1997 | Fredericks et al. | 395/825 |
| 5,613,068 A | 3/1997 | Gregg et al. | 395/200.13 |
| 5,706,432 A | 1/1998 | Elko et al. | |
| 5,944,797 A | 8/1999 | Gregg et al. | 709/237 |
| 5,948,060 A | 9/1999 | Gregg et al. | 709/212 |
| 6,195,739 B1 * | 2/2001 | Wright et al. | 712/19 |
| 6,442,669 B2 * | 8/2002 | Wright et al. | 712/19 |
| 6,510,496 B1 * | 1/2003 | Tarui et al. | 711/147 |
| 6,513,108 B1 * | 1/2003 | Kerr et al. | 712/19 |

FOREIGN PATENT DOCUMENTS

EP   0 707 399 A1   4/1996   ........... H04L/12/56

OTHER PUBLICATIONS

"Message Data Conversion", IBM Technical Disclosure Bulletin, vol. 38, No. 03, Mar. 1995, pp. 333–335.

* cited by examiner

Primary Examiner—Fritz Fleming
Assistant Examiner—Angel L. Casiano
(74) Attorney, Agent, or Firm—Lawrence D. Cutter, Esq.; Blanche E. Schiller, Esq.; Heslin Rothenberg Farley & Mesiti P.C.

(57) ABSTRACT

Data is moved between zones of a central processing complex via a data mover located within the central processing complex. The data mover moves the data without sending the data over a channel interface and without employing processor instructions to perform the move. Instead, the data mover employs fetch and store state machines and line buffers to move the data.

46 Claims, 14 Drawing Sheets

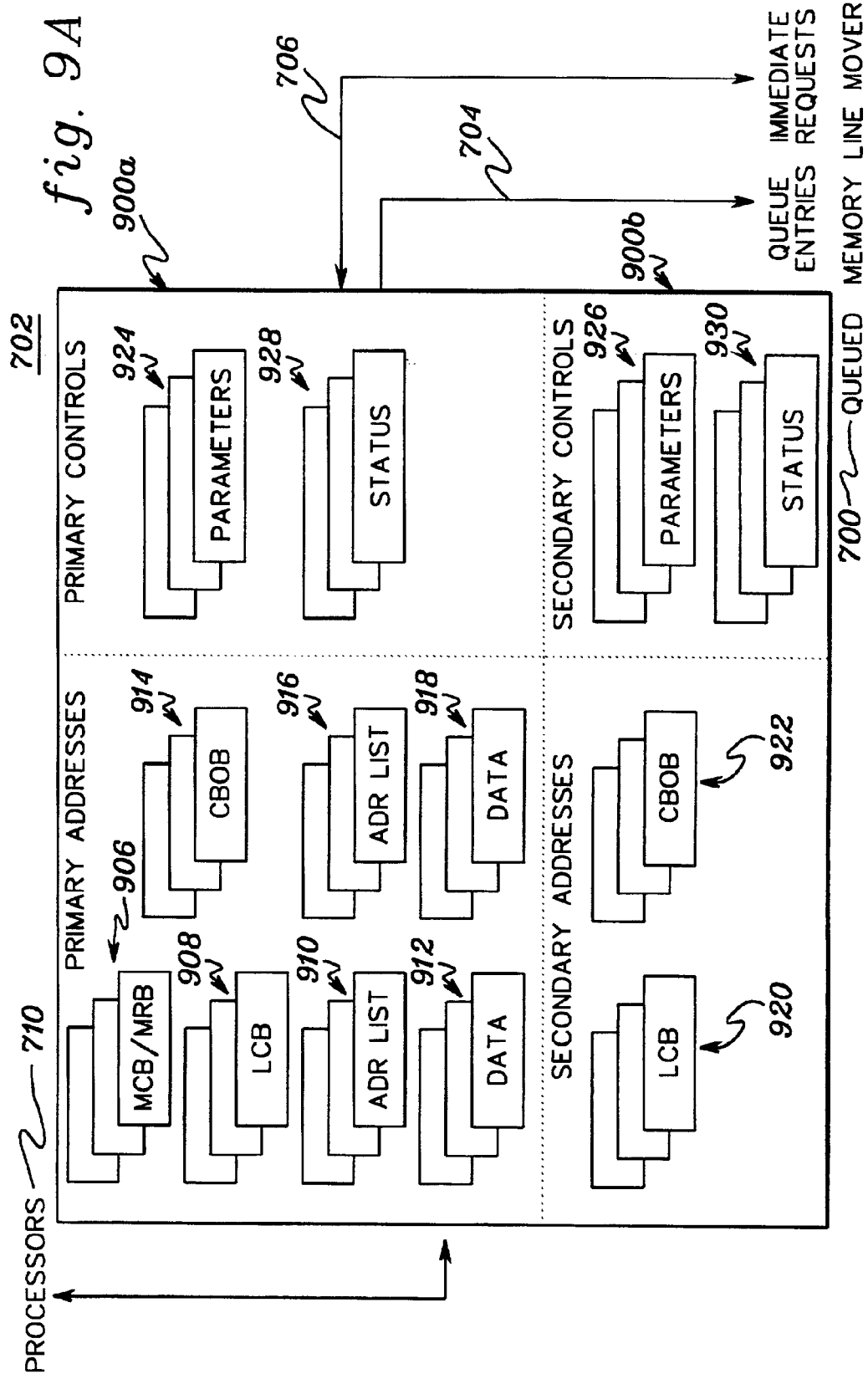

950

| | 0 | 1 | 2 | 3 | |
|---|---|---|---|---|---|
| 0 | | | | | MESSAGE SEGMENT |
| 1 | | | | | MESSAGE SEGMENT |
| 2 | | | | | MESSAGE SEGMENT |
| 3 | | | | | MESSAGE SEGMENT |

EMPLOYING A DATA MOVER TO COMMUNICATE BETWEEN DYNAMICALLY SELECTED ZONES OF A CENTRAL PROCESSING COMPLEX

TECHNICAL FIELD

The present invention relates, in general, to data communication, and in particular to, moving data between zones of a central processing complex.

BACKGROUND OF THE INVENTION

A central processing complex (CPC), offered by International Business Machines Corporation, is capable of concurrently executing a plurality of control zones. For example, a central processing complex 100 (FIG. 1a) executes one or more operating system zones 102 and a coupling facility zone 104. Each operating system zone 102 executes an operating system, such as for instance, the OS/390 (or Multiple Virtual Storage (MVS)) operating system, offered by International Business Machines Corporation; and coupling facility zone 104 executes coupling facility control code used in aiding the clustering of zones and/or multiple central processing complexes.

Previously, when an operating system zone and a coupling facility zone within a single central processing complex wished to communicate with each other, there were two options available, as shown in FIGS. 1a–1b. In FIGS. 1a, an operating system zone 102 communicated with a coupling facility zone 104 via a pair of I/O channels 106, 108, interconnected by an external cable 110. In particular, the data is passed from the main memory of the operating system zone to one of the I/O channels of the pair. Thereafter, it is moved from the one I/O channel to its corresponding I/O channel pair, and then to the main memory of the coupling facility zone. Data is similarly moved from the coupling facility zone to an operating system zone. The requirement of a pair of I/O channels, however, disadvantageously adds cost to CPC 100. Further, the I/O channels typically have limited bandwidth.

The second option is described with reference to FIG. 1b. In FIG. 1b, data is moved between an operating system zone 102 and coupling facility zone 104 via one or more processors 120, which execute a coupling facility zone program to move the data. Specifically, special processor instructions are made available to the coupling facility zone that allow its processors to move data between its main memory and main memory of the operating system zone. This internal virtual I/O channel eliminates the need for normal I/O channels, but is costly in that it requires processor resources (i.e., processor instructions) to perform the data movement.

Thus, although various options are currently available for moving data between operating system and coupling facility zones, a need still exists for an improved capability for communicating between zones of a central processing complex. In particular, a need exists for a data movement capability that moves data between the various zones, and is less costly and has better bandwidth than the previous techniques.

SUMMARY OF INVENTION

The shortcomings of the prior art are overcome and additional advantages are provided through the provision of a method of moving data between zones of a central processing complex. The method includes, for instance, initiating a move of data from one zone of the central processing complex to another zone of the central processing complex; and moving the data from the one zone to the another zone without using a channel interface and without using processor instructions.

In one embodiment, the moving is performed by a data mover located within the central processing complex and coupled to the one zone and the another zone.

In another embodiment, a method of moving data between zones of a central processing complex is provided. The method includes, for instance, moving data from one zone of the central processing complex to another zone of the central processing complex, wherein the moving includes, for instance: creating one or more queue entries associated with a message requesting the move; generating one or more fetch memory requests for the one or more queue entries to fetch the data from a memory of the one zone; using the one or more fetch memory requests to fetch the data from the memory of the one zone; placing the fetched data in one or more line buffers; generating one or more store memory requests using the fetched data placed in the one or more line buffers; and employing the one or more store memory requests to store the fetched data in a memory of the another zone.

Systems corresponding to the above-summarized methods are also described and claimed herein.

Advantageously, the capabilities of the present invention enable data to be moved between zones of a central processing complex, without requiring a channel interface or processor instructions. This reduces the cost of data movement and provides better bandwidth, without sacrificing protection of memory similarly afforded by channels.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9a depicts one embodiment of various components of the control logic of FIG. 7, in accordance with an aspect of the present invention;

FIG. 9b depicts one embodiment of a table used by the control logic of FIG. 9a to keep track of active requests, in accordance with an aspect of the present invention;

BEST MODE FOR CARRYING OUT THE INVENTION

In accordance with an aspect of the present invention, data is moved directly from one zone of a central processing complex to another zone of the central processing complex without sending the data over a channel interface and without employing processor instructions to perform the move. Instead, a hardware entity (i.e., a data mover) internal to the central processing complex is employed to move the data.

Figure 1A:
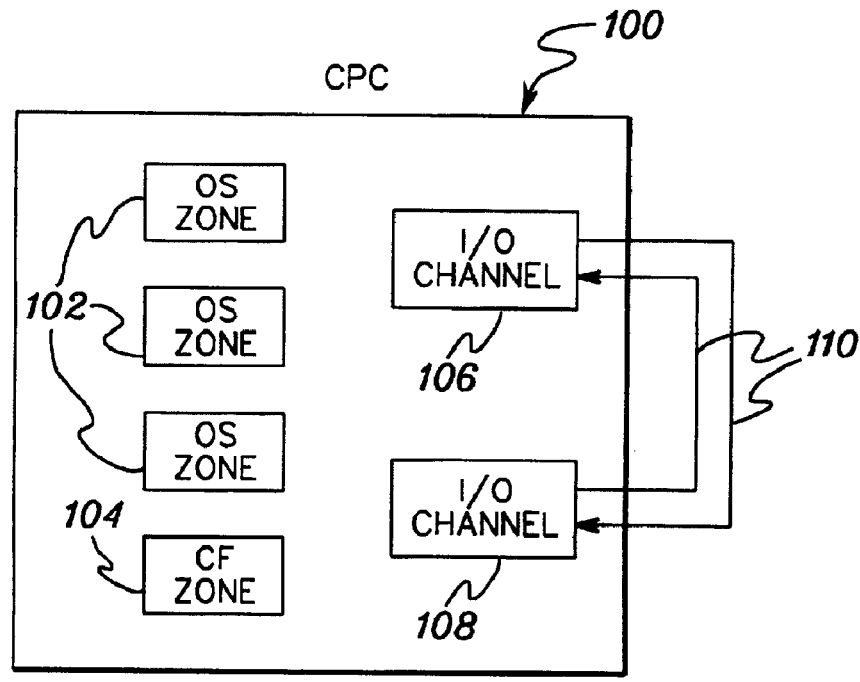
FIG. 1a depicts communications between an operating system zone and a coupling facility zone of the same central processing complex using a pair of I/O channels, in accordance with the prior art.
Figure 1B:
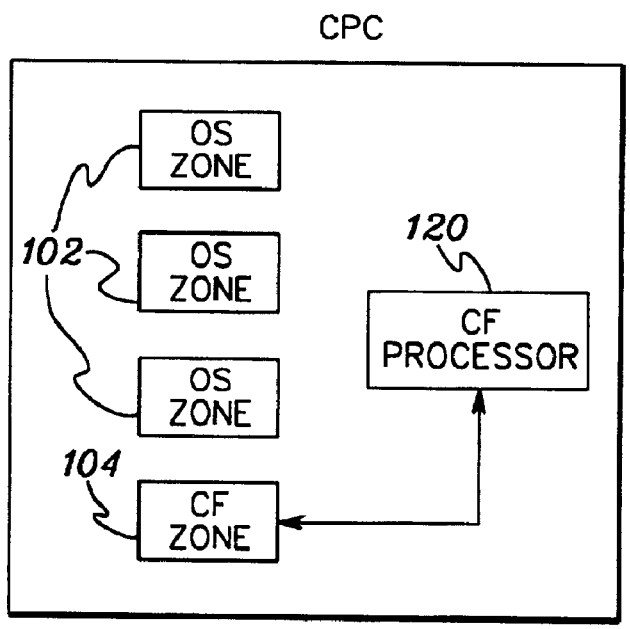
FIG. 1b depicts communications between an operating system zone and a coupling facility zone of the same central processing complex using processor instructions, in accordance with the prior art.
Figure 2:
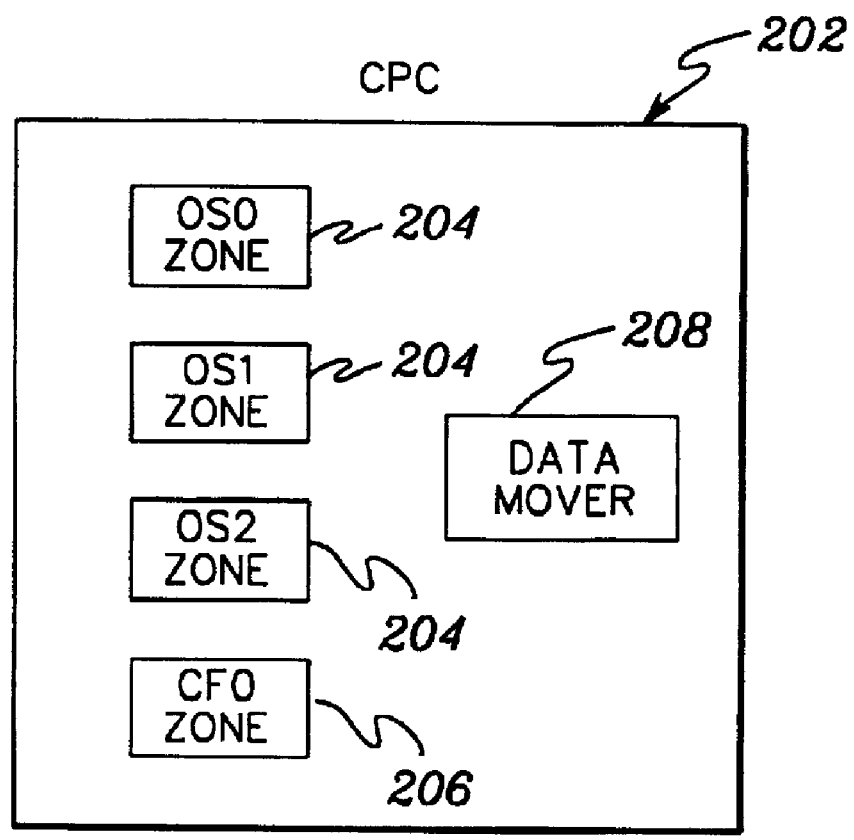
FIG. 2 depicts one example of a central processing complex including a data mover used in communicating between the zones of a central processing complex, in accordance with an aspect of the present invention.

One embodiment of a computing environment incorporating and using aspects of the present invention is described with reference to FIG. 2. Computing environment 200 is based, for instance, on the Enterprise Systems Architecture (ESA)/390 offered by International Business Machines Corporation, Armonk, N.Y. ESA/390 is described in an IBM publication entitled "Enterprise Systems Architecture/390 Principles Of Operation," IBM Publication No. SA22-7201-05, September 1998, which is hereby incorporated herein by reference in its entirety.

Computing environment 100 includes at least one central processing complex (CPC) 202, which executes one or more operating system zones 204, and at least one coupling facility zone 206. In this particular example, there are three operating system zones (OS0–OS2) and one coupling facility zone (CF0); however, this is only one example. Each operating system zone executes an operating system, such as, for instance, the OS/390™ (or Multiple Virtual Storage (MVS/ESA™)) operating system offered by International Business Machines Corporation, and each coupling facility zone 206 executes coupling facility control code used in aiding the clustering of zones and/or of multiple central processing complexes.

The coupling facility zone provides a coupling facility, which is a shareable facility that contains storage accessible by the other zones of this complex and other complexes and performs operations requested by a resource manager and/or programs running within the complex(es). In this particular example, the coupling facility is internal to the complex, which is logically partitioned.

Aspects of the operation of a coupling facility are described in detail in such references as Elko et al., U.S. Pat. No. 5,317,739, entitled "Method and Apparatus For Coupling Data Processing Systems", issued May 31, 1994; Elko et al., U.S. Pat. No. 5,561,809, entitled "In A Multiprocessing System Having A Coupling Facility, Communicating Messages Between The Processors And The Coupling Facility In Either A Synchronous Operation Or An Asynchronous Operation", issued on Oct. 01, 1996; Elko et al., U.S. Pat. No. 5,706,432, entitled "Mechanism For Receiving Messages At A Coupling Facility", issued Jan. 06, 1998; and the patents and applications referred to therein, all of which are hereby incorporated herein by reference in their entirety. Further, aspects of logical partitioning are described in, for instance, Guyette et al., U.S. Pat. No. 4,564,903, entitled "Partitioned Multiprocessor Programming System", issued on Jan. 14, 1986; Bean et al., U.S. Pat. No. 4,843,541, entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 08, 1996, each of which is hereby incorporated herein by reference in its entirety.

Each zone has its own independent area of main memory, and the zones can either have dedicated processor(s) or can logically share processor(s). For example, a single processor can be dedicated to a single zone, or a single processor can be shared by multiple zones.

In accordance with an aspect of the present invention, central processing complex 202 further includes a data mover 208 used to move data between the various zones of the CPC. As one example, data mover 208 moves data between a coupling facility zone and an operating system zone. As further examples, data mover 208 may move data between different operating system zones; between different coupling facility zones; or any combination thereof. The data mover moves the data between the various zones without requiring a channel interface between a pair of I/O channels, and without employing processor resources (e.g., processor instructions) to perform the data movement. The data mover is, for instance, a hardware entity that automatically moves the data between the main memories of the zones of the central processing complex, as described in further detail herein.

Figure 3:
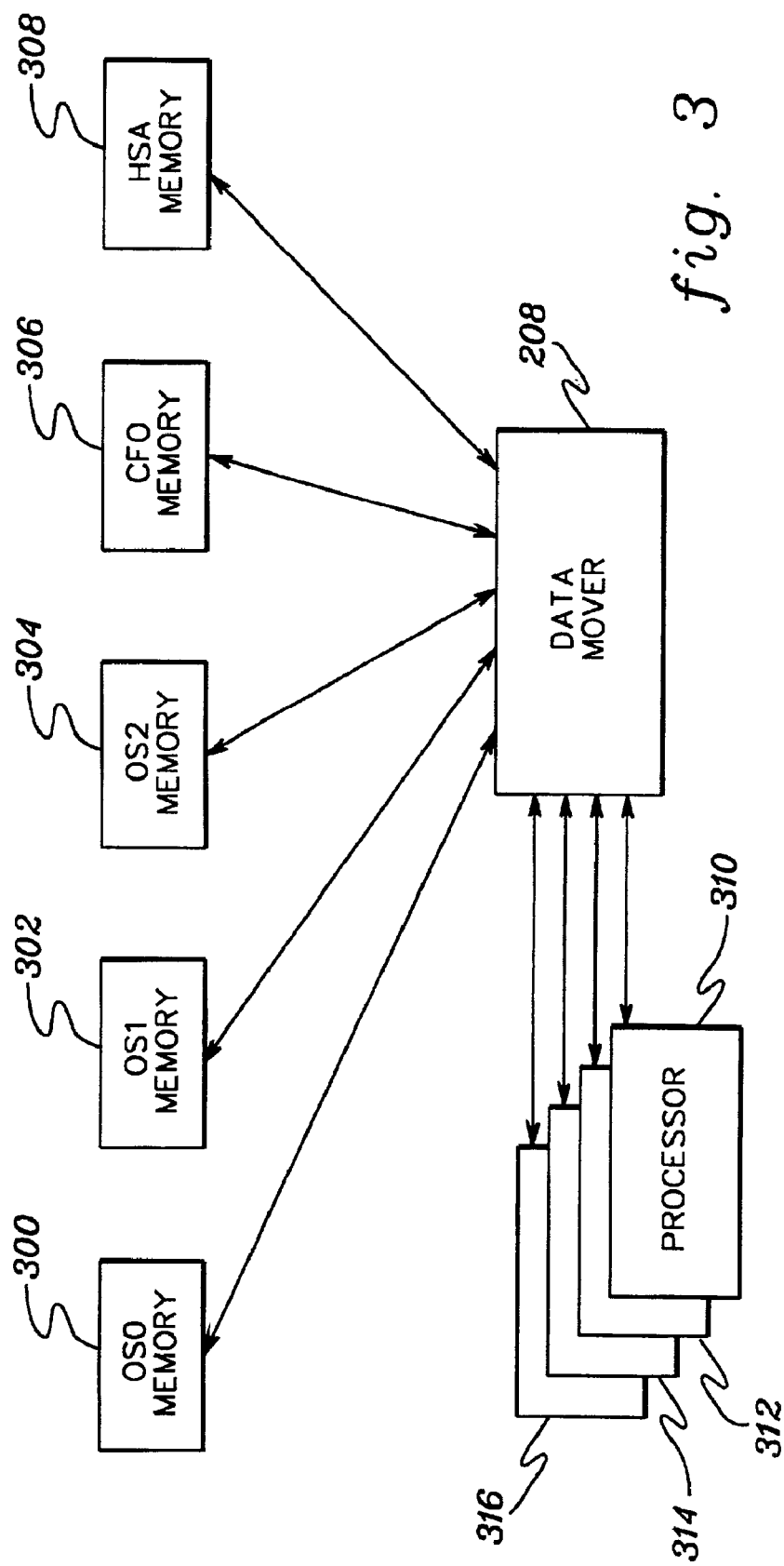
FIG. 3 depicts one example of the logical connections between the data mover of FIG. 2 and various zones within a central processing complex, in accordance with an aspect of the present invention.

In one embodiment, data mover 208 is logically connected to the CPC resources, as shown in FIG. 3. In particular, data mover 208 has access to each zone's main memory. For example, data mover 208 has access and is coupled to main memory 300 of Operating System 0, main memory 302 of Operating System 1, main memory 304 of Operating System 2, and main memory 306 of Coupling Facility 0. Additionally, data mover 208 has access and is coupled to a Hardware System Area (HSA) 308 of main memory. The HSA is a special area of main memory that is not accessible by any of the operating system or coupling facility zones. The CPC uses HSA memory for system-wide hypervisor functions, such as control information.

Each of the connections allows the data mover to move data directly from one zone's main memory to another zone's main memory without sending the data over a channel interface or consuming processor resources, as described in detail herein.

In addition to the connections to the main memories, the data mover has a connection to each of the processors of the various zones. For example, data mover 208 is coupled to processors 310, 312, 314, and 316 of Operating System 0, Operating System 1, Operating System 2 and Coupling Facility 0, respectively. Through these connections, each processor can send commands to the data mover and receive status and interruption information.

Further details regarding various components of the main memories of an operating system zone and a coupling facility zone are described with reference to FIG. 4. Additionally, one example of the flow of data when a message is passed from an operating system zone to a coupling facility zone (i.e., a primary message) is described with reference to FIGS. 4 and 5a–5b; and one example of the flow of data when a message is passed from a coupling facility zone to an operating system zone (i.e., a secondary message) is described with reference to FIGS. 4 and 6.

Figure 4:
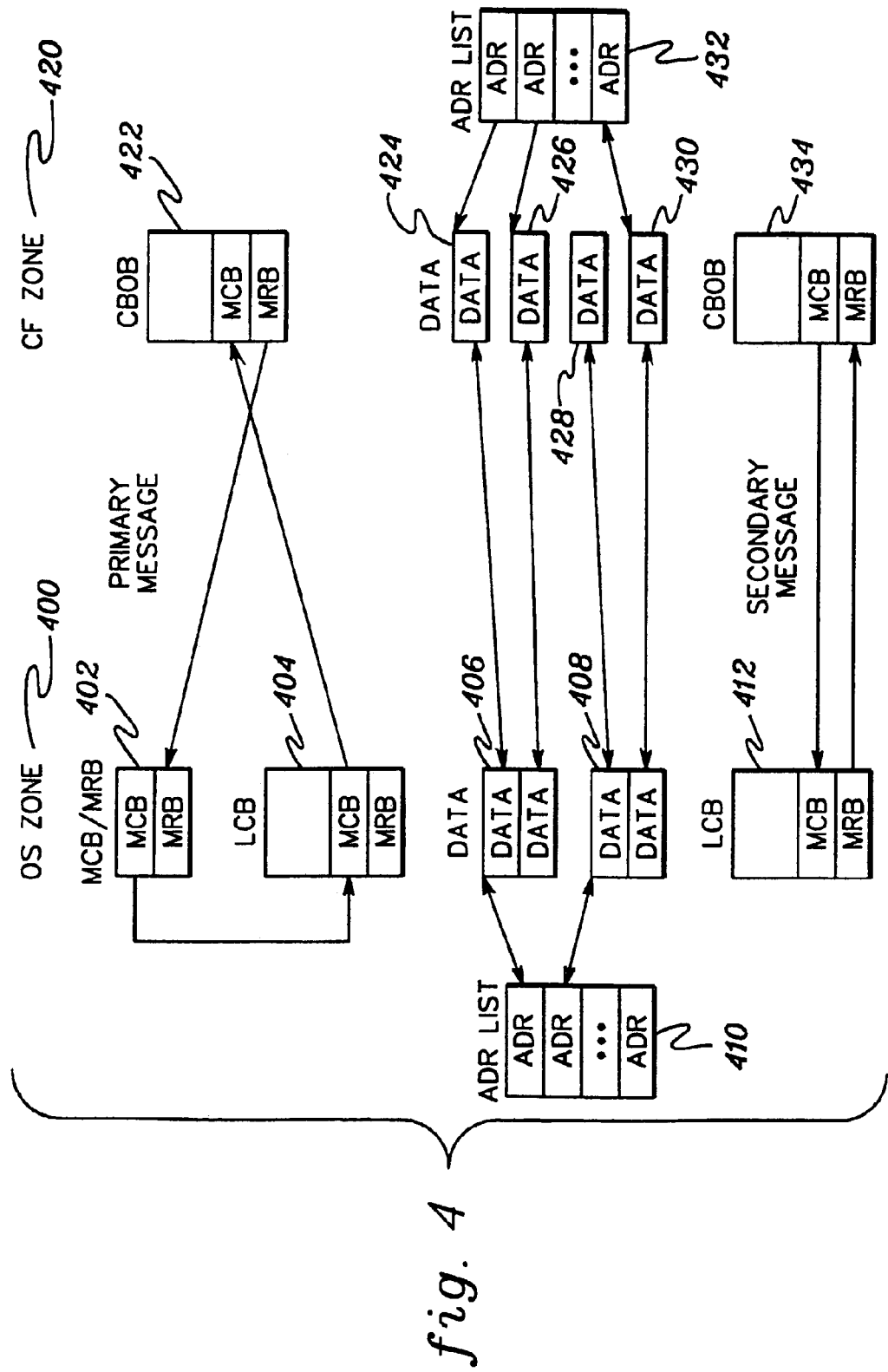
FIG. 4 depicts one example of various components of a main memory of an operating system zone and a main memory of a coupling facility zone, in accordance with an aspect of the present invention.

Referring to FIG. 4, an operating system zone's main memory 400 includes, for instance, a Message Control Block (MCB)/Message Response Block (MRB) 402 for storing commands and responses of a primary message; a Link Control Block (LCB) 404 used in sending the command of the primary message to the main memory of a coupling facility zone; one or more data areas 406, 408 for storing data of the primary message; an address list 410 for referencing the data of data areas 406, 408; and an LCB 412 used in receiving commands of a secondary message from the coupling facility zone and sending responses of the secondary message to the coupling facility zone.

A coupling facility zone's main memory 420 includes, for instance, a Channel Buffer Operation Block (CBOB) 422 for receiving commands of primary messages from LCB 404; one or more data areas 424, 426, 426, 430 for receiving data of the primary message; an address list 432 to reference data areas 424, 426, 428, 430; and a CBOB 434 for moving responses/commands of a secondary message to/from LCB 412.

Figure 5A:
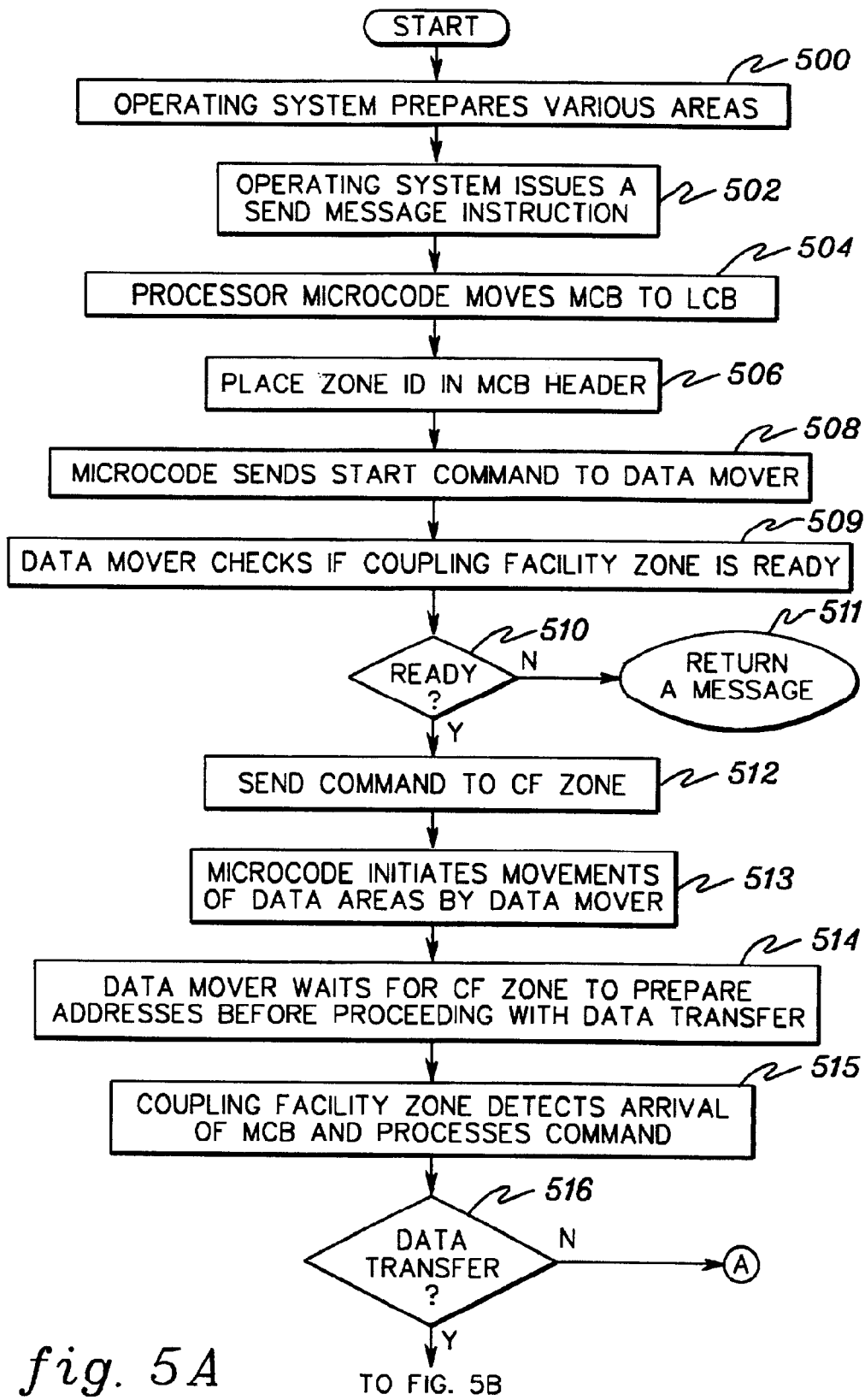
FIGS. 5a–5b depict one embodiment of the logic associated with the flow of data when processing a primary message, in accordance with an aspect of the present invention.
Figure 5B:
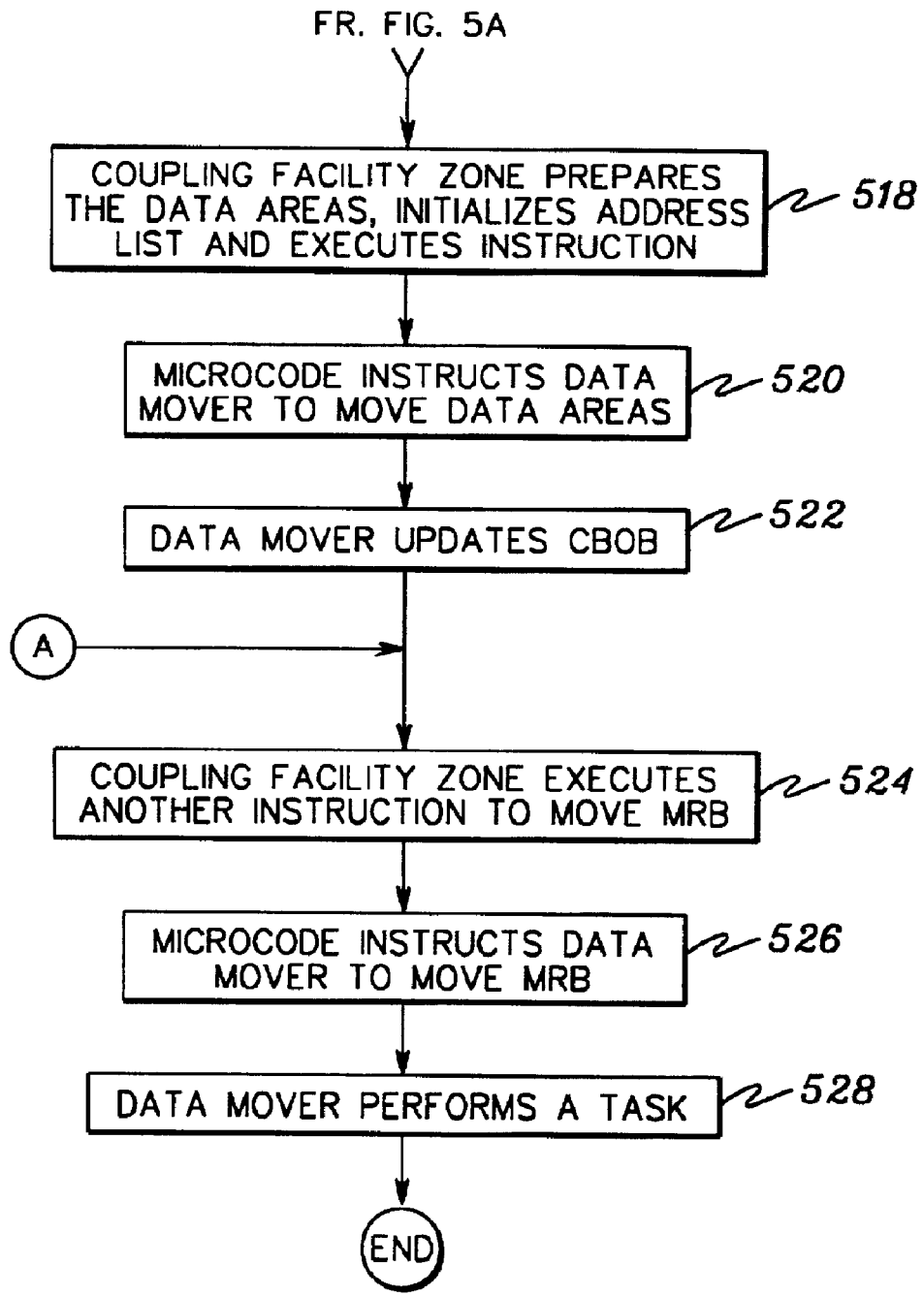

One embodiment of the flow of data when a message (i.e., a primary message) is passed from an operating system zone to a coupling facility zone is described with reference to FIGS. 4, and 5a–5b. Referring to FIG. 5a, initially, the operating system prepares various areas to be used for the data flow, STEP 500. For example, the operating system builds a message command (MCB) in MCB/MRB area 402 (FIG. 4), initializes address list 410, and prepares data areas 406, 408 for either a read (data transmitted from the coupling facility zone to the operating system zone) or a write (data transmitted from the operating system zone to the coupling facility zone).

Thereafter, the operating system issues a send message instruction to commence moving the data from the operating system zone to a coupling facility zone, STEP 502 (FIG. 5a). One example of a send instruction is described in Elko et al., U.S. Pat. No. 5,706,432, entitled "Mechanism For Receiving Messages At A Coupling Facility", issued Jan. 6, 1998, which is hereby incorporated herein by reference in its entirety.

The processor microcode of the operating system zone issuing the command interprets the send message instruction and moves the MCB from MCB/MRB area 402 (FIG. 4) to Link Control Block (LCB) 404, STEP 504 (FIG. 5a). The microcode then puts the zone ID of the operating system that is executing the send message instruction into the MCB header, STEP 506.

Next, the microcode sends a start hardware command to the data mover instructing it to move the MCB from LCB 404 (FIG. 4) to CBOB 422, STEP 508. One example of a start command is described in detail in Gregg et al., U.S. Pat. No. 5,944,797, entitled "Data Mover Hardware Controlled Processing In A Commanding System And In A Commanded System For Controlling Frame Communications On A Link", issued Aug. 31, 1999, which is hereby incorporated herein by reference in its entirety.

Figure 5C:
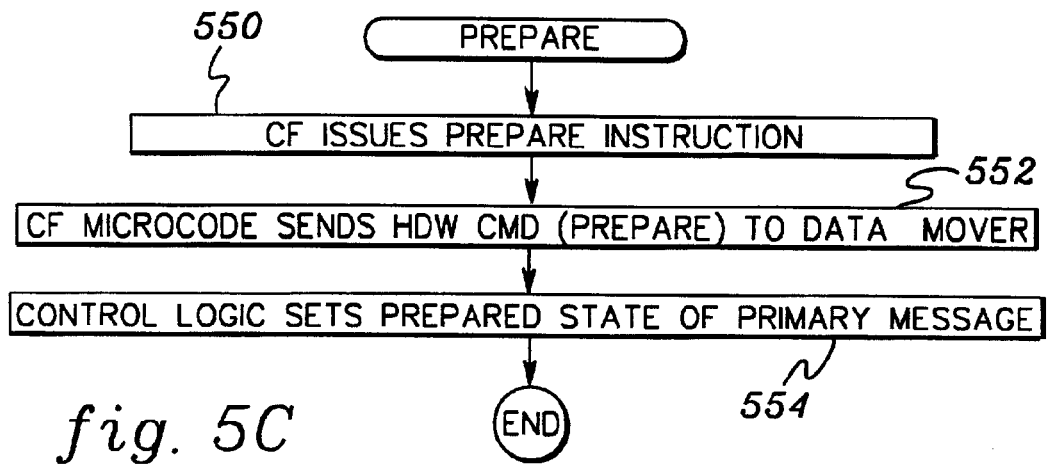
FIG. 5c depicts one embodiment of the logic associated with preparing buffers, in accordance with an aspect of the present invention.

When the data mover receives the start command, it checks whether CBOB 422 is ready to receive the command, STEP 509. In one example, it makes this determination by checking a prepared bit in a status buffer of the control logic of the data mover (described below). In particular, in order to prepare the CBOB, the coupling facility zone issues a prepare instruction, STEP 550 (FIG. 5c). (One example of a prepare instruction is described in Elko et al., U.S. Pat. No. 5,706,432, entitled "Mechanism For Receiving Messages At A Coupling Facility", issued Jan. 6, 1998, which is hereby incorporated herein by reference in its entirety.) Then, the coupling facility microcode sends a prepare hardware command to the data mover, which includes the address of the CBOB in the coupling facility zone's main memory, STEP 552. The control logic of the data mover sets the CBOB address and sets the prepared state for the message buffer, STEP 554.

If the CBOB is not ready, INQUIRY 510, then the operating system microcode generates and MRB indicating such, STEP 511, and processing of the primary message is complete. However, if the CBOB is ready, then the data mover moves the command to the CBOB, STEP 512.

Additionally, the microcode initiates movement of data areas by the data mover by sending a list hardware command to the data mover when there are data areas to be transferred, STEP 513. One example of a list command is described in Gregg et al., U.S. Pat. No. 5,948,060, entitled "Speeding-Up Communication Rates On Links Transferring Data Structures By A Method Of Handing Scatter/Gather Of Storage Blocks In Commanded Computer Systems", issued Sep. 7, 1999, which is hereby incorporated herein by reference in its entirety.

The data mover then waits for the coupling facility zone to prepare its addresses before proceeding with the data transfer, STEP 514. In one example, the data mover detects that the coupling facility is prepared when the data mover has received a list command from both the operating system zone and the coupling facility zone.

In the meantime, when coupling facility zone 420 (FIG. 4) detects the arrival of MCB in CBOB 422, it processes the command, STEP 515. If the command specifies a data transfer, INQUIRY 516, then the coupling facility zone prepares one or more data areas 424, 426, 428, 430, initializes address list 432, and executes an instruction to move the data, STEP 518. The processor microcode that interprets this instruction sends a list hardware command to the data mover instructing it to move the data areas to or from the operating system zone, STEP 520. The data mover receives this second list command, determines that the coupling facility zone is prepared, and moves the data.

When all of the data areas have been transferred, the data mover updates the CBOB to signal the successful completion of data transfer to the coupling facility zone, STEP 522. Thereafter, or if there is no data to be transferred, INQUIRY 516 (FIG. 5a), the coupling facility zone executes another instruction to move the message response block (MRB), STEP 524. The microcode that interprets this instruction sends a respond hardware command to the data mover instructing it to move the MRB from CBOB 422 to MCB/MRB area 402 in the operating system zone, STEP 526. One example of a respond command is described in Elko et al., U.S. Pat. No. 5,706,432, entitled "Mechanism For Receiving Messages At A Coupling Facility", issued Jan. 6, 1998, which is hereby incorporated herein by reference in its entirety.

When the MRB is received, the data mover either updates LCB 404 or interrupts a processor to indicate the successful completion of the message, STEP 528. This completes the data flow of a primary message in which data is moved from an operating system zone to a coupling facility zone. Additional details relating to the processing of primary messages is described further below with reference to FIGS. 10*a*–10*b*.

In the logic described above, various steps may be performed in differing order. For instance, the order in which the list commands are received by the data mover may be in a different order than described above. Other steps may also be varied without departing from the spirit of the present invention. The above is only one embodiment.

Figure 6:
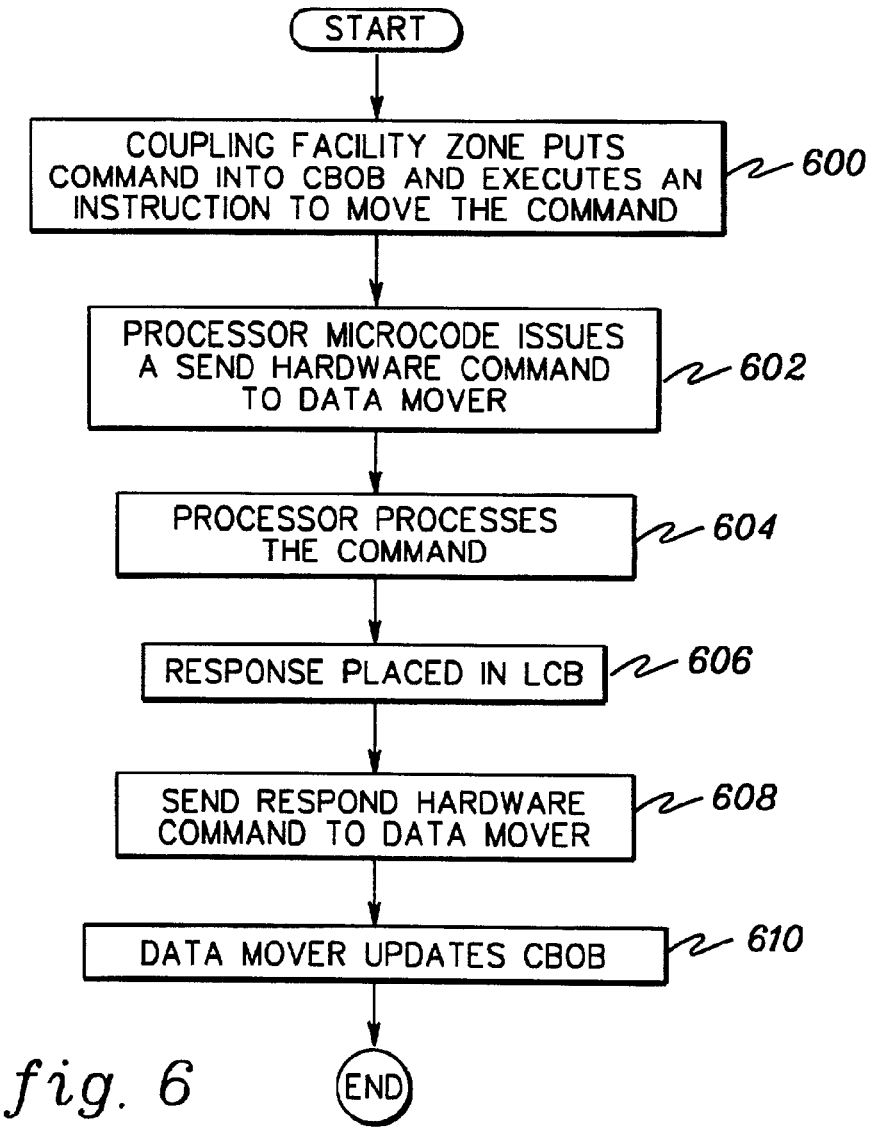
FIG. 6 depicts one embodiment of the logic associated with the flow of data when processing a secondary message, in accordance with an aspect of the present invention.

One embodiment of the flow of data when a message (i.e., a secondary message) is passed from a coupling facility zone to an operating system zone is described with reference to FIGS. 4 and 6. In one example, when a secondary message is to be sent from coupling facility zone 420 (FIG. 4) to operating system zone 400, the coupling facility zone puts the command (MCB) into CBOB 434 and executes an instruction to move the command, STEP 600 (FIG. 6). The processor microcode that interprets the command issues a send secondary hardware command to the data mover instructing it to move the MCB from the CBOB directly to LCB 412, STEP 602. Then, a processor (any of the processors in the CPC) is interrupted to process the command, STEP 604.

When the command is finished, and the response (MRB) is placed in LCB 412, STEP 606, a respond hardware command is sent to the data mover instructing it to send the MRB from the LCB to CBOB 434 in the coupling facility zone's main memory, STEP 608. After the data mover successfully moves the MRB, it updates the CBOB to signal completion of the command to the coupling facility zone, STEP 610. This completes the data flow of a secondary message.

Figure 7:
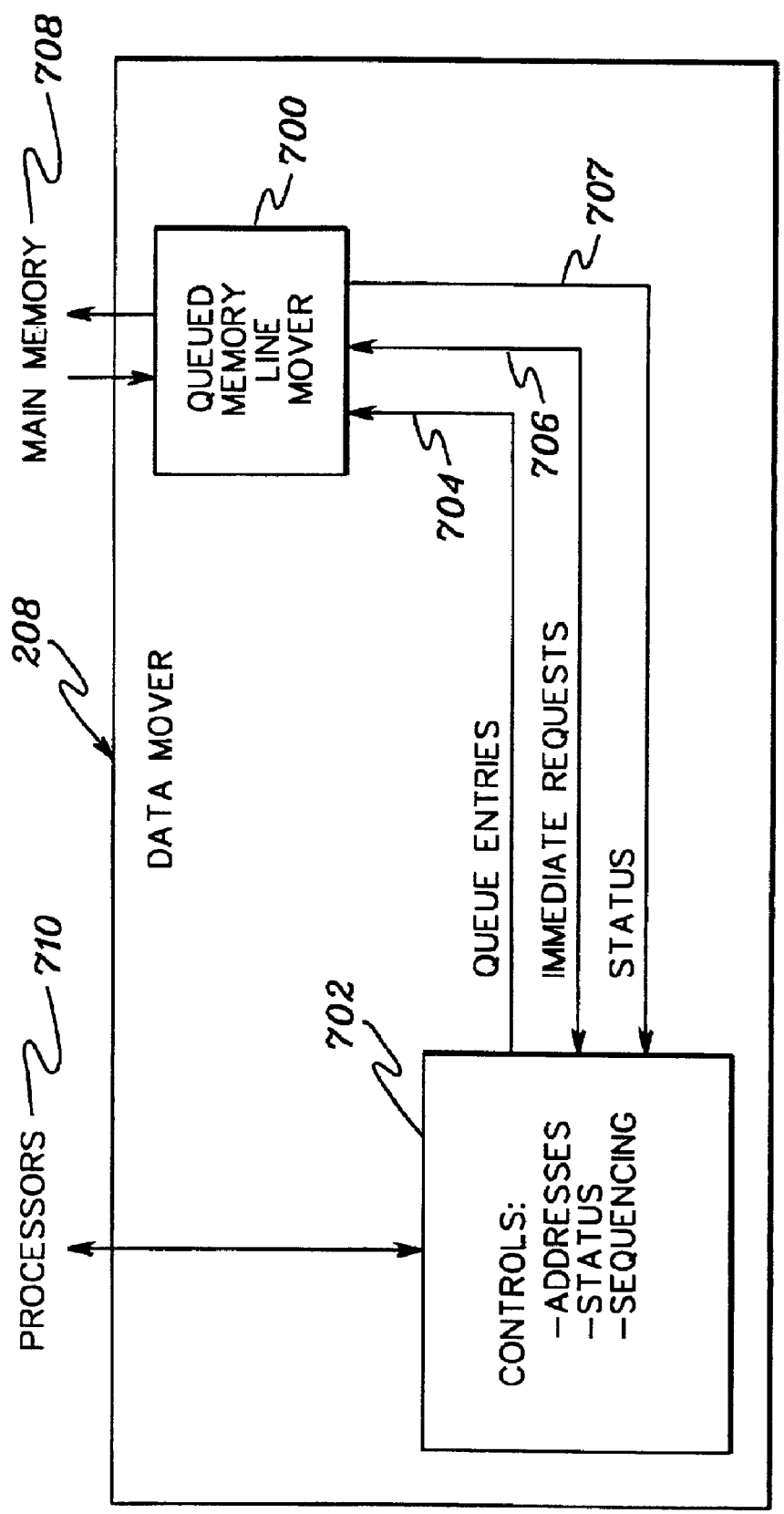
FIG. 7 depicts one embodiment of various components of the data mover of FIG. 2, in accordance with an aspect of the present invention.

Further details regarding the movement of data and an implementation of the data mover are described with reference to FIGS. 7–11. Referring to FIG. 7, data mover 208 includes, for instance, a queued memory line mover 700 and control logic 702, each of which is described in further detail below.

In one embodiment, queued memory line mover 700 receives from control logic 702 queue entries 704, each of which represents, for instance, two memory requests (e.g., a fetch and a store of a command (MCB), a response (MRB), or data); and immediate requests 706, which represents high priority requests (e.g., requests for addresses) that are not queued. Additionally, queued memory line mover 700 sends status information 707 to the control logic indicating completion of the memory requests.

Queued memory line mover 700 is the interface to main memory 708, and in accordance with an aspect of the present invention, is responsible for moving the data between zones in main memory. In one example, the queued memory line mover moves data from one zone's main memory to another zone's main memory in groups of memory lines. Each memory line is typically 128 bytes and is on address boundaries of 128 bytes, but larger and smaller lines can be used. The memory requests to main memory subsystem 708 instruct it to either fetch some number of data bytes (up to, e.g., 128 bytes, a memory line) or store some number of bytes (also up to, e.g., 128 bytes). Further details of queued memory line mover 700 are described with reference to FIG. 8.

Figure 8:
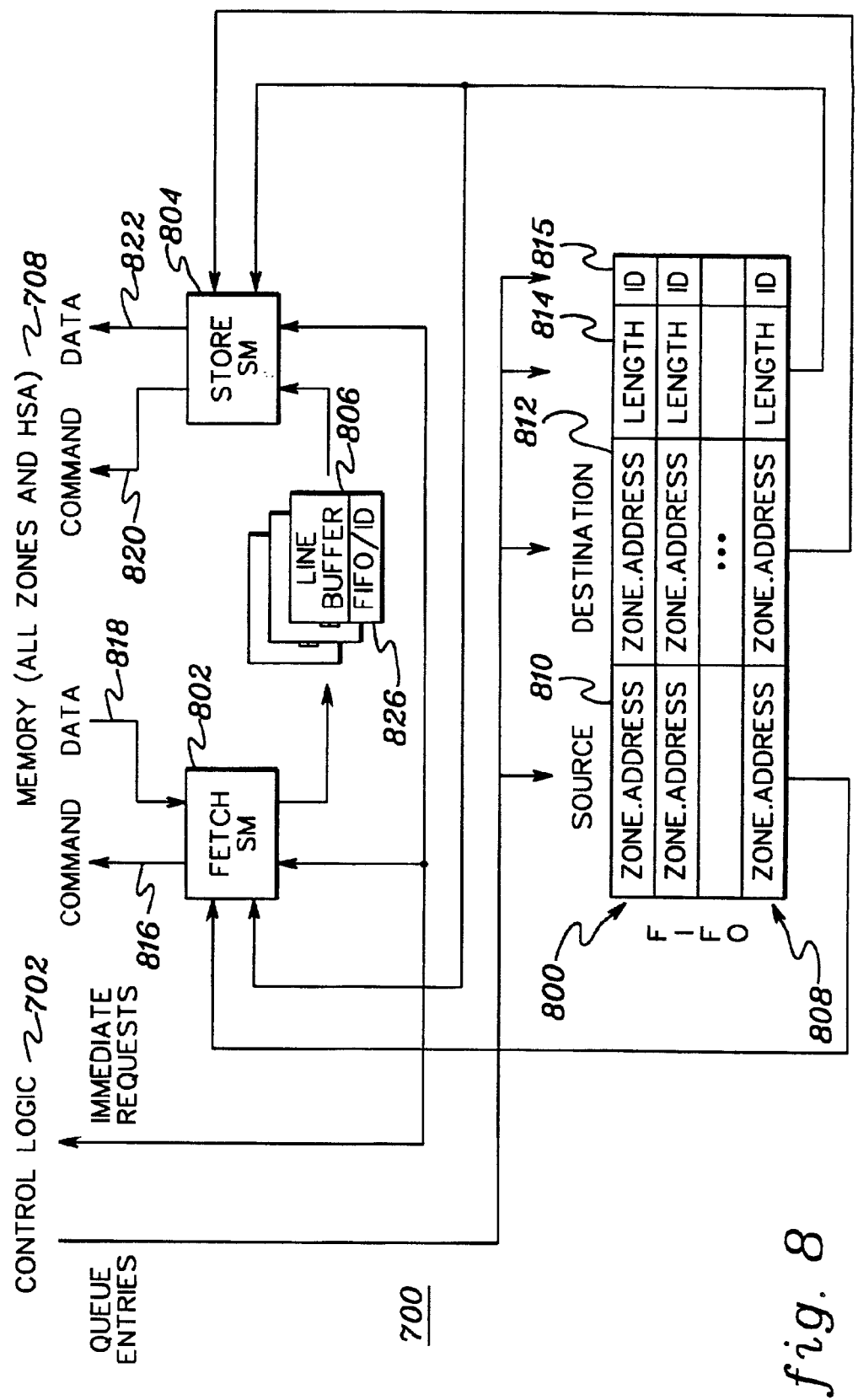
FIG. 8 depicts one embodiment of various components of the queued memory line mover of FIG. 7, in accordance with an aspect of the present invention.

Referring to FIG. 8, queued memory line mover 700 includes, for instance, a FIFO (first in, first out) array 800 that temporarily holds information received from control logic 702 to form memory requests; a fetch state machine 802 that forms memory fetch requests to fetch data from a main memory of one zone; a store state machine 804 that forms memory store requests to store the fetched data in a main memory of another zone; and one or more line buffers 806 that temporarily store the fetched data. Each of the components of queued memory line mover 700 is further described below.

FIFO array 800 includes a plurality of queue entries 808, and each queue entry 808 includes, for example, a main memory source address 810 indicating the location in main memory of the requested data; a destination address 812 indicating the location in main memory to store the retrieved data; a length parameter (e.g., byte count) 814 indicating the size of the data; and an ID 815 identifying the queue entry. Source memory address 810 and destination memory address 812 each have two parts. The first is the zone ID and the second is the address within the zone; each zone's addressing starts at address zero, in this embodiment.

Fetch state machine 802 reads source addresses 810 and length parameters 814 from FIFO queue 800, and forms memory fetch requests 816 to the main memory subsystem. The memory fetch request includes, for instance, an indication that it is a memory request, an address from where it wants the data (i.e., source address 810), and a count of the data (i.e., length 814). When the data is returned (818) from the main memory subsystem, it is temporarily stored in one of line buffers 806.

The line buffers hold the fetched data until store operations are processed. In addition to the fetched data, each line buffer also includes control information 826 used in associating the data with a queue entry, as described below.

Main memory subsystem 708 is capable of processing several memory requests at once. In other words, multiple memory requests can be outstanding simultaneously, and the responses to those requests may not necessarily be in the same order as the initial requests. This improves the throughput of the main memory subsystem. For the queued memory line mover to exploit this feature of the main memory subsystem, multiple line buffers 806 are used. (The number of line buffers depends on the number of outstanding requests allowed.) Each time a memory fetch operation is sent to the main memory subsystem, a line buffer is allocated. If all of the line buffers are busy (waiting for their associated memory store operations to finish), no new memory fetch requests are made. Also, when any line buffer becomes full, the queued memory line mover initiates a memory store operation.

When a line buffer is full, store state machine 804 reads destination addresses 812 and length parameters 814 from FIFO queue 800, and forms memory store requests 820 to the main memory subsystem. In this example, the data to be stored is included with the request and thus, would be included with command 820. However, in another example, the data may be separate from the command, and thus, forwarded on data line 822. When the memory store operation completes, the main memory subsystem returns status to the queued memory line mover, whcih forwards the status onto control logic 702.

One embodiment of control logic 702 is described with reference to FIGS. 7 and 9a–9b. Referring initially to FIG. 7, control logic 702 receives commands (e.g., hardware commands) from one or more processors 710 of one or more of the zones, and sends interrupts to the processors. Further, it generates queue entries 704, which are provided to queued memory line mover 700; it updates control blocks (such as LCBs and CBOBs); and it fetches addresses for data movement over immediate requests path 706.

In one example, an immediate request indicates a high priority request, and thus, does not use the array or line buffers of the queued memory line mover. Instead, the addresses, data length, and data of the immediate request are received by the queued memory line mover directly from the control logic, and that memory request is executed immediately by the queued memory line mover. In particular, when the control logic wishes to fetch address information from main memory, it sends the address of the address field in a control block along with a byte count (typically eight bytes) to the queued memory line mover. The queued memory line mover then sends a fetch command to the main memory subsystem, when it is allowed to send the next memory request. When the data is returned, it is sent back to the control logic along with a status code.

When the control logic wishes to update an LCB or CBOB, it sends the address of the field within the LCB or CBOB and the data (typically eight bytes) to the queued memory line mover. The queued memory line mover then sends a store request to the main memory subsystem, when it is allowed to send the next memory request. When the memory operation completes, the queued memory line mover sends a completion status back to the control logic.

Further details of control logic 702 are described with reference to FIG. 9a. Control logic 702 receives commands (e.g., hardware commands, such as list, send, etc., as described herein) from one or more processors 710 and sends interrupts back to the processors. Additionally, the control logic sends queue entries 704 and immediate memory requests 706 to queued memory line mover 700. In one embodiment, the control logic is divided into two parts: one part 900a for processing primary messages from an operating system zone to a coupling facility zone, and the other part 900b for processing secondary messages from a coupling facility zone to an operating system zone.

The control logic for both the primary and secondary messages includes, for instance, an address register for each of the memory areas shown in FIG. 4. For example, MCB/MRB 402 is stored in MCB/MRB address register 906 in the control logic; LCB 404 corresponds to LCB 908; address list 410 corresponds to address list 910; data 406, 408 correspond to data 912; CBOB 422 corresponds to CBOB 914; address list 432 corresponds to address list 916; data 424, 426, 428, 430 corresponds to data 918; LCB 412 corresponds to LCB 920; and CBOB 434 corresponds to CBOB 922.

Primary message address registers 906, 908, 910, 912 belong to operating system zones and primary address registers 914, 916, 918 belong to coupling facility zones. Likewise, secondary message address register 920 belongs to the operating system zones, and secondary address register 922 belongs to the coupling facility zones. There are also parameter registers 924, 926 and status registers 928, 930. Parameter registers contain message control parameters such as data transfer direction indication, MCB length, number of data areas, data area length(s), MRB length, etc. The status registers indicate the progress of the message. For example, state information in the status register indicates the prepared state of the message, an offset into the address list, the current (or next) memory line transfer sent to the queued memory line mover, etc.

In the example described herein, each of the registers is shown as a group of registers (e.g., three registers) indicating the capability of processing multiple messages simultaneously. The facilities to exchange a single message are collectively called a message buffer. In practice, the groups may contain any number of registers depending on the level of message multiplexing desired by the CPC.

When the control logic wishes to move a part of a message (i.e., a message segment, such as an MCB, an MRB, or data) between zones, it generates one or more queue entries 704 to send to the queued memory line mover. For example, consider transferring a 264 byte MCB. Assuming a memory line size of 128 bytes and assuming that the MCB starts on a 256 byte main memory address boundary, the control logic generates three queue entries. The first entry has the source and destination addresses and a length of 128 bytes, the second entry has the source (+128) and destination (+128) addresses and a length of 128 bytes, and the third entry has the source (+256) and destination (+256) addresses and a length of 8 bytes. Each entry also includes an identifier for that entry.

The control logic keeps track of the progress of each queue entry. Since the queue entries may complete in a different order than they were queued, the control logic makes sure that all of the queue entries for a particular part of the message are completed before proceeding. The control logic also interleaves queue entries for multiple simultaneous messages. This technique gives fairness while ensuring forward progress, and is further described with reference to FIGS. 7–9b.

In particular, each queue entry sent from the control logic to the FIFO of the queued memory line mover includes ID 815 (FIG. 8). When there is a pending request in the FIFO (each entry represents one or more requests (i.e., a fetch and/or a store)) and a line buffer is available, the queued memory line mover takes the request from the FIFO and stores the FIFO location in controls 826 of the line buffer. The queued memory line mover then makes a fetch request 816 to the main memory subsystem. When the fetch request completes and the data line is in the line buffer, the FIFO location information is used to index back into the FIFO to find the destination address for the memory line of data. Further, (e.g., at substantially the same time), the FIFO location in line buffer controls 826 is replaced by the ID from the FIFO, and the FIFO location is now free to receive the next request from the control logic. Next, the queued memory line mover makes a store request 820 to the main memory subsystem. When the store request completes successfully, the queued memory line mover forwards the memory response with the ID field in line buffer controls 826 back to the control logic.

Since it typically requires several line move operations to move each part of a message (i.e., a message segment), the control logic keeps a table 950 (FIG. 9b) that is associated with the active operations. For example, one implementation allows four message segments (i.e., different segments, the same segments, or a combination thereof) to each have up to four requests outstanding to the queued memory line mover. That is, each row 952 of the table represents a message segment, and each column of the first four columns represents a memory request of that segment. The last column identifies the message segment.

As message segments are processed, they are assigned to a group of four bits to keep track of the progress of the segment, and a message segment identifier is placed in table 950. Each subsequent request sent to the queued memory line mover is given a four bit ID 815. Two of the bits identify which of the groups of four bits (i.e., a row) is being used to process the message segment, and the other two bits identify one of the four bits in the group (i.e., a column). When four requests are made, all four bits of the group are set. As the queued memory line mover finishes each request, the ID field in the response sent back to the control logic resets the appropriate bit in table 950, and the control logic is free to make the next request.

The priority scheme used by the control logic is first come first served at the message segment level. Once a segment is chosen, one of the four bit groups of table 950 is assigned to the message segment. All of the memory lines are moved for the message segment before the group is reassigned to the next message segment.

The table described above is only one example. In other embodiments, the table may have more or less rows and/or columns, and may contain more, less or different information.

Further details regarding an embodiment of the operation of control logic 702 is described with reference to FIGS. 10–11. In particular, the processing of a primary message is further described with reference to FIGS. 10a and 10b, and the processing of a secondary message is further described with reference to FIG. 11.

Figure 10A:
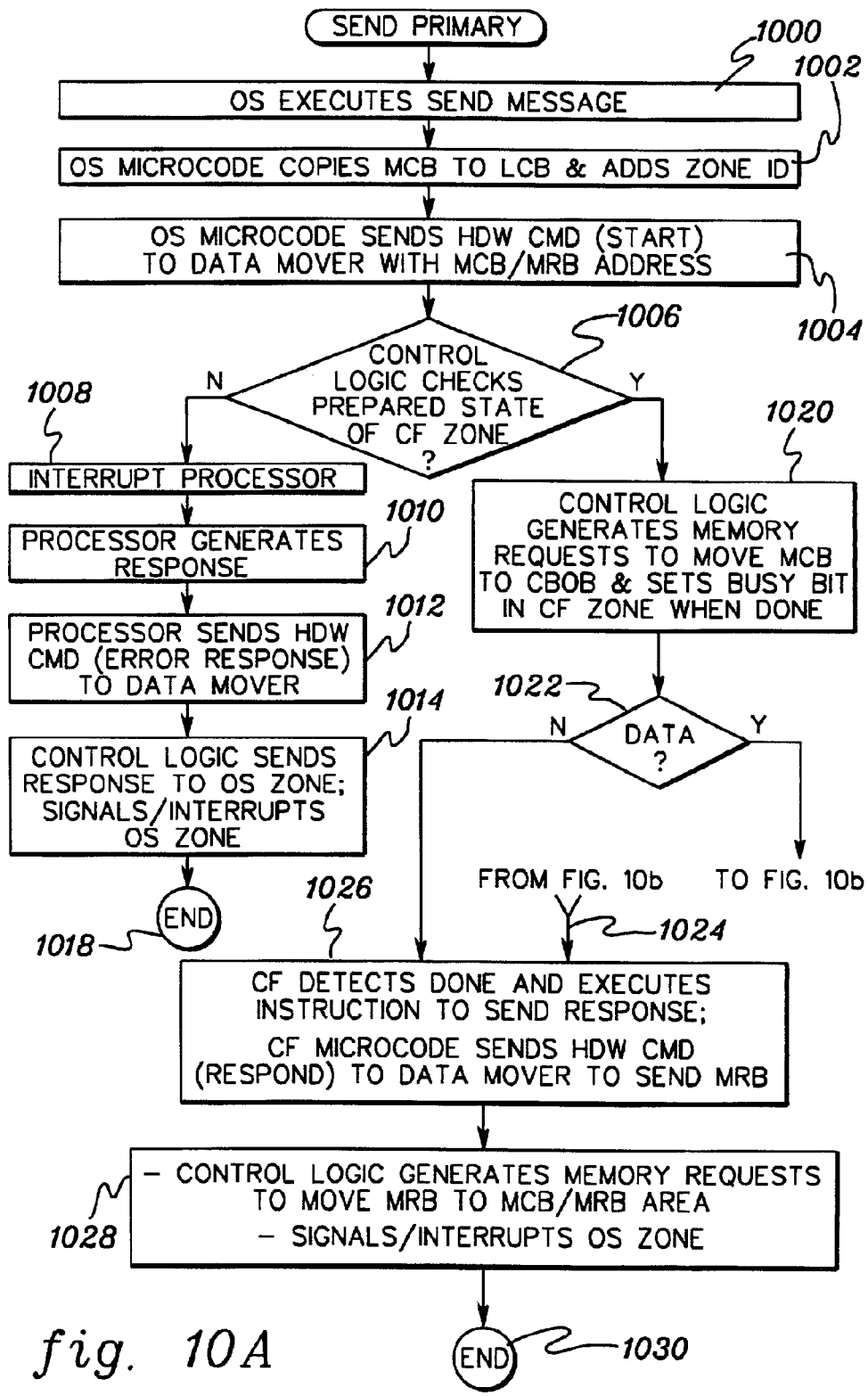
FIGS. 10a–10b depict one embodiment of the operation of the control logic associated with processing a primary message, in accordance with an aspect of the present invention.
Figure 11:
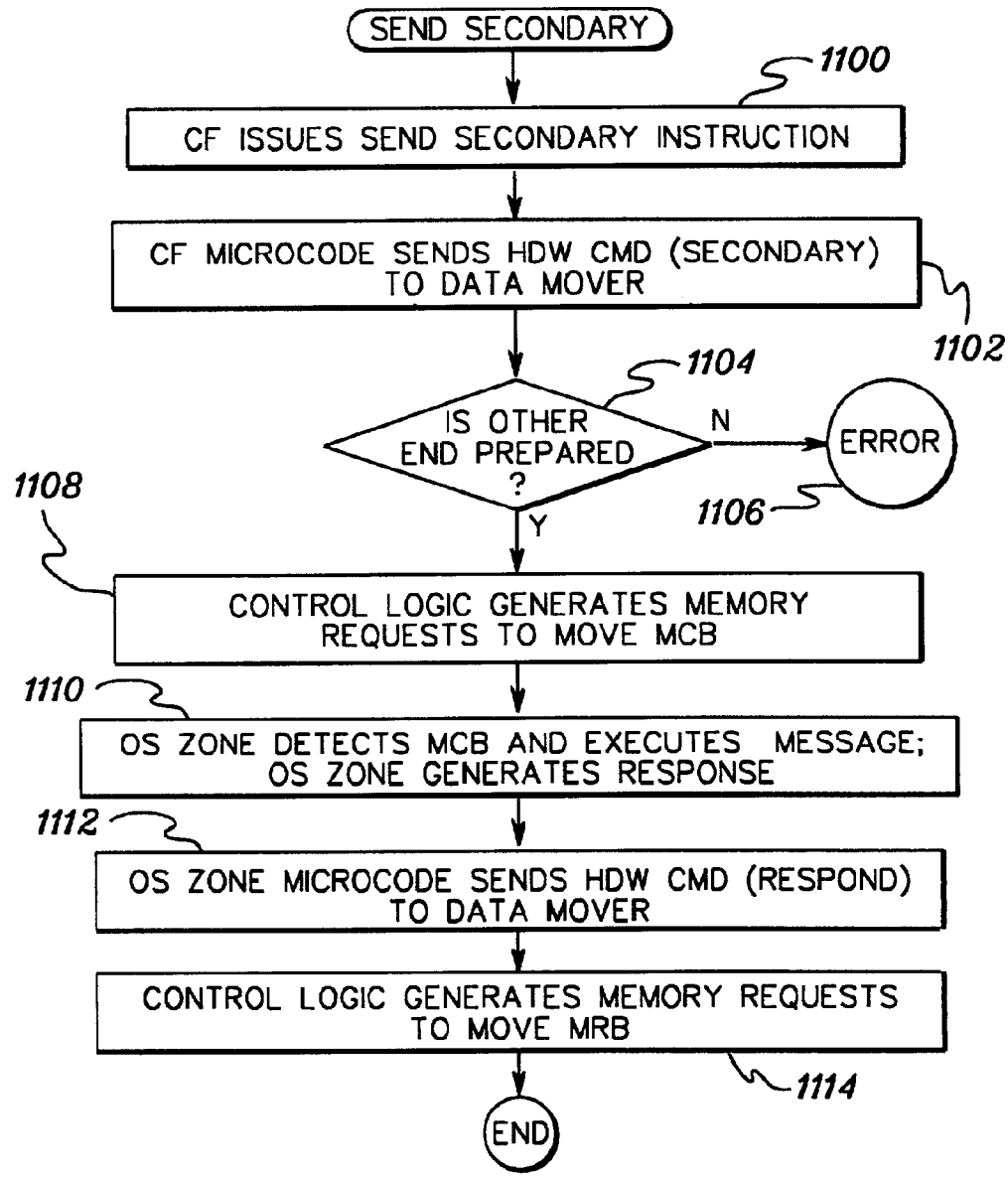
FIG. 11 depicts one embodiment of the operation of the control logic associated with processing a secondary message, in accordance with an aspect of the present invention.

Referring to FIG. 10a, when an operating system zone wishes to send a primary message to a coupling facility zone, it builds an MCB in the MCB/MRB area and executes a send message instruction, STEP 1000. The microcode executing the send message instruction copies the MCB to the LCB where the operating system zone ID is written into the MCB header, STEP 1002. The microcode then sends a start hardware command to the data mover, STEP 1004. This hardware command includes the address of the MCB/MRB area in the operating system zone's main memory.

When the control logic receives the start hardware command, it checks the prepared state of the coupling facility zone, INQUIRY 1006. In particular, the control logic checks a prepared field in a status buffer 928 to determine whether the coupling facility zone is prepared. If the coupling facility zone is not prepared, the control logic generates an interrupt to the processor, STEP 1008, and does not transfer the MCB to the coupling facility zone. The interrupt causes the processor to interrogate the control logic to determine that an error response should be sent back to the operating system zone, STEP 1010. The error response hardware command is sent to the data mover instructing it to send the error response MRB from a location in HSA to the MCB/MRB area in the operating system zone's main memory, STEP 1012. Note that the MCB/MRB area address is already known to the data mover by the previous start hardware command. The control logic sends the response to the operating system zone and signals/interrupts the operating system zone, STEP 1014. This completes processing of the primary message, STEP 1018.

Returning to INQUIRY 1006, if the coupling facility zone is prepared, the control logic generates queue entries to move the MCB from the LCB in the operating system zone to the CBOB in the coupling facility zone, STEP 1020. The queue entries are processed by the queued memory line mover. When the control logic detects that the entire MCB has been moved to the CBOB, it sets a signal (in this embodiment through a busy bit in the hardware observable to the coupling facility zone) informing the coupling facility zone that a message has arrived.

Thereafter, a determination is made as to whether there are data areas to be moved, INQUIRY 1022. If there are data areas to be moved, the logic of FIG. 10b is performed, as described below. When there is no data to transfer, INQUIRY 1022, or after the data has been successfully transferred, STEP 1024, the coupling facility detects this condition and generates a response, STEP 1026. In particular, the coupling facility microcode sends a respond hardware command to the data mover instructing it to generate memory requests to move the MRB from the CBOB in the coupling facility zone's main memory to the MCB/MRB area in the operating system zone's memory. The control logic generates the memory requests to move the MRB to the MCB/MRB area, and signals/interrupts the operating system zone, STEP 1028. This completes processing of the primary message, STEP 1030.

Figure 10B:
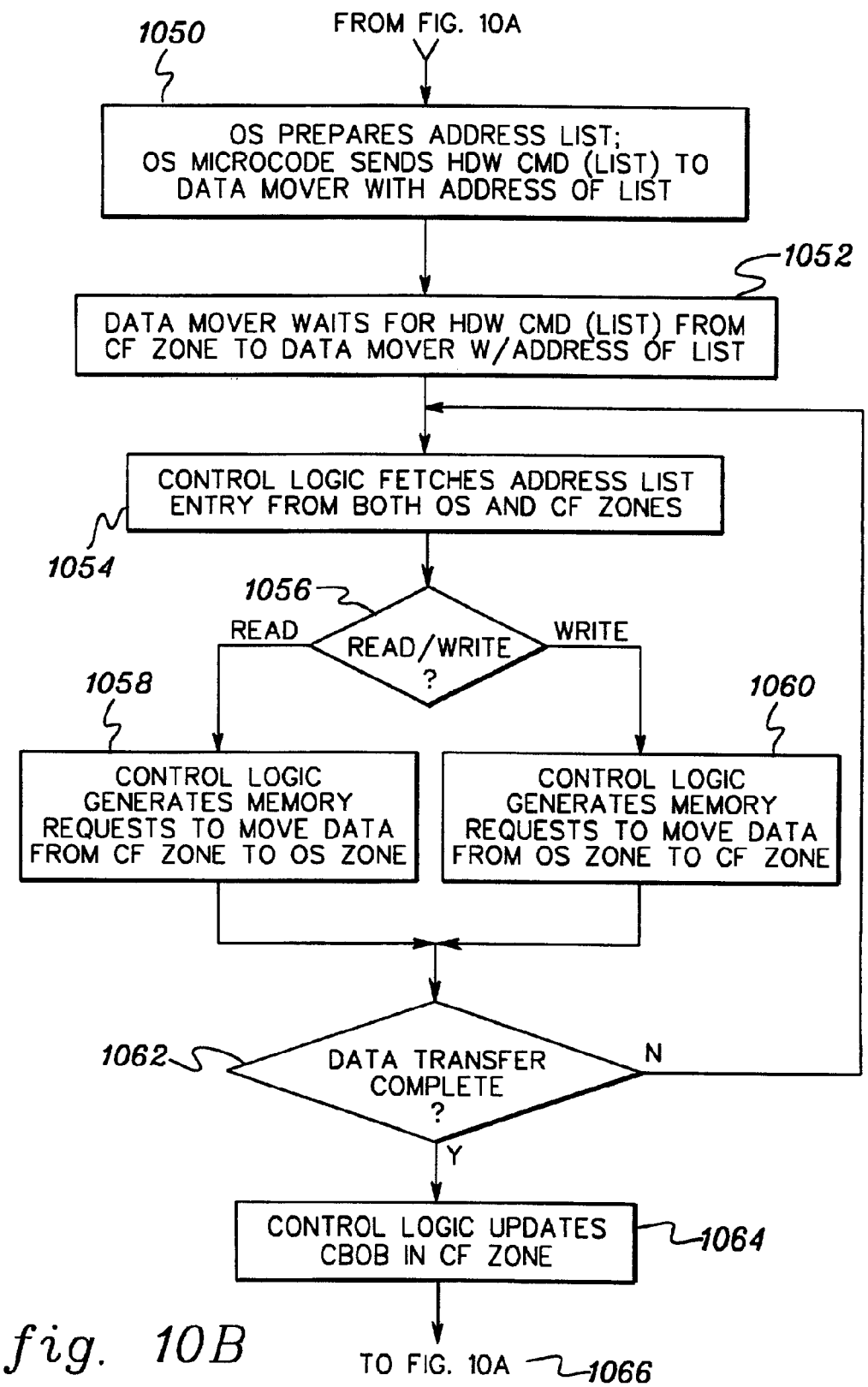

Returning to INQUIRY 1022, if there is data to be transferred, the logic of FIG. 10b is employed. In one example, initially, the operating system zone prepares a list of data addresses, and then the operating system microcode sends a list hardware command to the data mover, STEP 1050. This command includes the direction of data transfer (e.g., read/write), the address of the beginning of the address list, the length of each data area, and the number of data areas to transfer. The data mover does not start to transfer the data until microcode in the coupling facility zone also sends a list hardware command to the data mover, STEP 1052. This list hardware command from the coupling facility zone also includes the direction of data transfer, the address of the beginning of the address list, the length of each data area, and the number of data areas to transfer. At this point, the control logic has the information required to fetch the first address in each of the two lists, STEP 1054.

After the addresses have been fetched, the control logic determines if the data transfer is for a read or write operation, INQUIRY 1056. If it is a read operation, the data transfer is from the coupling facility zone to the operating system zone. In this case, the addresses from the coupling facility zone are placed in the source address area of the queue entries and the addresses from the operating system zone are placed in the destination address area of the queue entries, STEP 1058. However, if it is a write operation, the data transfer is from the operating system zone to the coupling facility zone. In this case, the addresses from the operating system zone are placed in the source address area of the queue entries and the addresses from the coupling facility zone are placed in the destination address area of the queue entries, STEP 1060.

After all of the data for the first address of the list has been transferred, a determination is made as to whether the data transfer is complete, INQUIRY 1062. If it is not complete, the control logic fetches the next address from the list, STEP 1054. Note that the lengths of each data area (pointed to by an address in the list) do not have to be the same in the operating system and coupling facility zones. The control logic fetches addresses from the operating system and coupling facility lists independently after their respective byte counts have been exhausted.

Returning to INQUIRY 1062, when the data transfer is complete, the control logic informs the coupling facility zone by updating the CBOB, STEP 1064. Control is then passed back to FIG. 10a, where the message response is sent, STEP 1066.

One embodiment of the flow for processing secondary messages is described with reference to FIG. 11. Initially, the coupling facility issues a send secondary message, STEP 1100. Then, the microcode issues a send hardware command to the data mover that includes the length of the secondary message, STEP 1102. Therafter, a determination is made as to whether the other end is prepared, INQUIRY 1104. If it is not prepared, an error is signaled, STEP 1106. Otherwise, the control logic generates memory requests to send the MCB from the CBOB in the coupling facility zone's main memory to the LCB in the operating system zone's memory, STEP 1108. The operating system zone's microcode detects the secondary message, processes the command, and generates a response, STEP 1110. The operating system microcode then sends a respond hardware command to the data mover that includes the length of the response, STEP 1112. The control logic moves the response MRB from the LCB in the operating system zone's main memory to the CBOB in the coupling facility zone's memory completing the message exchange, STEP 1114.

Described in detail above is a data mover used to move data (e.g., commands, responses and/or data areas) between zones of a central processing complex. Advantageously, the data mover moves this data without using processor instructions and without using a channel interface. This reduces the cost of the data movement, and optimizes the movement, since the hardware employed is specially tailored to directly move the data between the zones. The data mover also provides memory protection, in a similar manner as channels.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

I claim the following:

1. A method of moving data between zones of a central processing complex, said method comprising:
    initiating a move of data from one zone of said central processing complex to another zone of said central processing complex, wherein said another zone is dynamically selected; and
    moving said data from said one zone to said another zone without using a channel interface and without using processor instructions.

2. The method of claim 1, wherein said data comprises at least one of a command, a response and one or more data areas.

3. The method of claim 1, wherein said one zone is one of an operating system zone and a coupling facility zone and said another zone is the other of said operating system zone and said coupling facility zone.

4. The method of claim 1, wherein said moving is performed by a data mover located within said central processing complex and coupled to said one zone and said another zone.

5. The method of claim 4, wherein said initiating comprises instructing said data mover to perform the move.

6. The method of claim 4, wherein said data mover comprises a fetch state machine and a store state machine employed in moving said data.

7. The method of claim 1, further comprising determining whether said another zone is ready for the move, wherein the move does not take place until said another zone is ready.

8. The method of claim 7, wherein said determining comprises determining whether said another zone is ready to receive a command from said one zone, wherein the move does not take place until said another zone is ready to receive the command.

9. The method of claim 7, wherein said determining comprises checking a buffer to determine whether said another zone is ready.

10. The method of claim 9, wherein said buffer is of a data mover used for said moving.

11. The method of claim 1, wherein said moving comprises determining whether said another zone is ready to receive one or more data areas of said data, prior to moving the one or more data areas from said one zone to said another zone.

12. The method of claim 11, wherein said determining comprising determining whether a predefined command is received from said one zone and said another zone by a data mover employed to perform the move, wherein receipt of the predefined command from said one zone and said another zone indicates said another zone is prepared to receive the one or more data areas.

13. The method of claim 1, wherein said moving comprises:
    fetching data from a main memory of said one zone using one or more fetch memory requests generated by a fetch state machine; and
    storing the fetched data in a main memory of said another zone using one or more store memory requests generated by a store state machine.

14. The method of claim 13, further comprising placing said fetched data in one or more line buffers, which are used by said store state machine to generate the one or more store memory requests.

15. The method of claim 13, wherein at least one of said one or more fetch memory requests and said one or more store memory requests is generated using information retrieved from an array coupled to at least one of said fetch state machine and said store state machine.

16. The method of claim 13, wherein said fetching comprises processing by said main memory of said one zone said one or more fetch memory requests to fetch said data, wherein one or more responses by said main memory of said one zone to said one or more fetch memory requests are not necessarily in a same order as receipt of the one or more fetch memory requests.

17. The method of claim 13, further comprising tracking progress of the fetching of the data and the storing of the fetched data.

18. A method of moving data between zones of a central processing complex, said method comprising:
    moving data from one zone of said central processing complex to another zone of said central processing complex, wherein said another zone is dynamically selected and wherein said moving comprises:
        creating one or more queue entries associated with a message requesting the move;
        generating one or more fetch memory requests for said one or more queue entries to fetch the data from a memory of said one zone;
        using the one or more fetch memory requests to fetch the data from the memory of said one zone;

placing the fetched data in one or more line buffers;
generating one or more store memory requests using the fetched data placed in the one or more line buffers; and
employing the one or more store memory requests to store the fetched data in a memory of said another zone.

19. The method of claim 18, wherein said moving is performed by a data mover located within said central processing complex and coupled to said one zone and said another zone.

20. The method of claim 19, wherein said data mover comprises control logic to perform the creating, and a queued memory line mover to perform the generating of one or more fetch memory requests, the placing of the fetched data in one or more line buffers, and the generating of one or more store memory requests.

21. A system of moving data between zones of a central processing complex, said system comprising:
means for initiating a move of data from one zone of said central processing complex to another zone of said central processing complex, wherein said another zone is dynamically selected; and
means for moving said data from said one zone to said another zone without using a channel interface and without using processor instructions.

22. The system of claim 21, wherein said data comprises at least one of a command, a response and one or more data areas.

23. The system of claim 21, wherein said one zone is one of an operating system zone and a coupling facility zone and said another zone is the other of said operating system zone and said coupling facility zone.

24. The system of claim 21, wherein said means for moving comprises a data mover located within said central processing complex and coupled to said one zone and said another zone.

25. The system of claim 24, wherein said means for initiating comprises means for instructing said data mover to perform the move.

26. The system of claim 24, wherein said data mover comprises a fetch state machine and a store state machine employed in moving said data.

27. The system of claim 21, further comprising means for determining whether said another zone is ready for the move, wherein the move does not take place until said another zone is ready.

28. The system of claim 27, wherein said means for determining comprises means for determining whether said another zone is ready to receive a command from said one zone, wherein the move does not take place until said another zone is ready to receive the command.

29. The system of claim 27, wherein said means for determining comprises means for checking a buffer to determine whether said another zone is ready.

30. The system of claim 29, wherein said buffer is of a data mover used for said moving.

31. The system of claim 21, wherein said means for moving comprises means for determining whether said another zone is ready to receive one or more data areas of said data, prior to moving the one or more data areas from said one zone to said another zone.

32. The system of claim 31, wherein said means for determining comprising means for determining whether a predefined command is received from said one zone and said another zone by a data mover employed to perform the move, wherein receipt of the predefined command from said one zone and said another zone indicates said another zone is prepared to receive the one or more data areas.

33. The system of claim 21, wherein said means for moving comprises:
means for fetching data from a main memory of said one zone using one or more fetch memory requests generated by a fetch state machine; and
means for storing the fetched data in a main memory of said another zone using one or more store memory requests generated by a store state machine.

34. The system of claim 33, further comprising means for placing said fetched data in one or more line buffers, which are used by said store state machine to generate the one or more store memory requests.

35. The system of claim 33, wherein at least one of said one or more fetch memory requests and said one or more store memory requests is generated using information retrieved from an array coupled to at least one of said fetch state machine and said store state machine.

36. The system of claim 33, wherein said means for fetching comprises means for processing by said main memory of said one zone said one or more fetch memory requests to fetch said data, wherein one or more responses by said main memory of said one zone to said one or more fetch memory requests are not necessarily in a same order as receipt of the one or more fetch memory requests.

37. The system of claim 33, further comprising means for tracking progress of the fetching of the data and the storing of the fetched data.

38. A system of moving data between zones of a central processing complex, said system comprising:
means for moving data from one zone of said central processing complex to another zone of said central processing complex, wherein said another zone is dynamically selected and wherein said means for moving comprises:
means for creating one or more queue entries associated with a message requesting the move;
means for generating one or more fetch memory requests for said one or more queue entries to fetch the data from a memory of said one zone;
means for using the one or more fetch memory requests to fetch the data from the memory of said one zone;
means for placing the fetched data in one or more line buffers;
means for generating one or more store memory requests using the fetched data placed in the one or more line buffers; and
means for employing the one or more store memory requests to store the fetched data in a memory of said another zone.

39. The system of claim 38, wherein said means for moving comprises a data mover located within said central processing complex and coupled to said one zone and said another zone.

40. The system of claim 39, wherein said data mover comprises control logic to perform the creating, and a queued memory line mover to perform the generating of one or more fetch memory requests, the placing of the fetched data in one or more line buffers, and the generating of one or more store memory requests.

41. A system of moving data between zones of a central processing complex, said system comprising:
one zone of said central processing complex and a dynamically selected zone of said central processing complex; and
a data mover coupled to said one zone and said dynamically selected zone to move data from said one zone to said dynamically selected zone without using a channel interface and without using processor instructions.

42. The system of claim 41, wherein said one zone is one of an operating system zone and a coupling facility zone and said another zone is the other of said operating system zone and said coupling facility zone.

43. The system of claim 41, wherein said data mover comprises a fetch state machine and a store state machine employed in moving said data.

44. The system of claim 43, wherein said fetch state machine generates one or more fetch memory requests to fetch data from a main memory of said one zone, and wherein said store state machine generates one or more store memory requests to store the fetched data in a main memory of said another zone.

45. The system of claim 44, further comprising one or more line buffers to hold said fetched data, said one or more line buffers being used by said store state machine to generate the one or more store memory requests.

46. A system of moving data between zones of a central processing complex, said system comprising:

a data mover to move data from one zone of said central processing complex to another zone of said central processing complex, wherein said another zone is dynamically selected and said data mover comprises:

one or more queue entries associated with a message requesting the move;

a fetch state machine to generate one or more fetch memory requests for said one or more queue entries to fetch the data from a memory of said one zone;

one or more line buffers coupled to said fetch state machine to receive the fetched data; and a store state machine coupled to said one or more line buffers to generate one or more store memory requests using the fetched data of the one or more line buffers, wherein the one or more store memory requests are used to store the fetched data in a memory of said another zone.

* * * * *